(12) United States Patent
Mamatkhan et al.

(10) Patent No.: US 9,188,418 B2
(45) Date of Patent: Nov. 17, 2015

(54) TAPE MEASURE DEVICE, SYSTEM AND METHOD

(71) Applicants: Mir A. Mamatkhan, Wellington, FL (US); Gulshoda D. Mirova-Mamatkhan, Wellington, FL (US)

(72) Inventors: Mir A. Mamatkhan, Wellington, FL (US); Gulshoda D. Mirova-Mamatkhan, Wellington, FL (US)

( * ) Notice: Subject to any disclaimer, the term of this patent is extended or adjusted under 35 U.S.C. 154(b) by 97 days.

(21) Appl. No.: 13/972,940

(22) Filed: Aug. 22, 2013

(65) Prior Publication Data

US 2015/0052771 A1 Feb. 26, 2015

(51) Int. Cl.
*G01B 3/10* (2006.01)

(52) U.S. Cl.
CPC ...... *G01B 3/1084* (2013.01); *G01B 2003/1089* (2013.01)

(58) Field of Classification Search
CPC .................. G01B 3/10; G01B 3/1084; G01B 2003/1089; G01B 3/1041; G01B 3/1071
USPC .................................................. 33/768, 770
See application file for complete search history.

(56) References Cited

U.S. PATENT DOCUMENTS

| | | | | |
|---|---|---|---|---|
| 1,598,993 A * | 9/1926 | Vlazny | .............................. | 33/42 |
| 2,651,843 A * | 9/1953 | Goodford | .................... | 33/27.03 |
| 4,744,150 A * | 5/1988 | Horvath | ......................... | 33/760 |
| 4,766,673 A * | 8/1988 | Bolson | ........................... | 33/760 |
| 4,999,924 A * | 3/1991 | Shields | ........................... | 33/770 |
| 5,014,436 A * | 5/1991 | Kozyrski et al. | ............. | 33/27.03 |
| 5,040,256 A * | 8/1991 | Mills | ................................ | 33/760 |
| 5,197,195 A * | 3/1993 | Aikens | .............................. | 33/42 |
| 5,379,524 A * | 1/1995 | Dawson | .......................... | 33/768 |
| 5,515,617 A * | 5/1996 | Canfield | ......................... | 33/768 |
| 5,577,329 A * | 11/1996 | States | .............................. | 33/768 |
| 5,671,543 A * | 9/1997 | Sears | .............................. | 33/668 |
| 5,711,085 A * | 1/1998 | Adams | ............................ | 33/768 |
| 5,809,662 A | 9/1998 | Skinner | | |
| 5,992,038 A * | 11/1999 | Harmon et al. | ................. | 33/768 |
| 6,041,513 A * | 3/2000 | Doak | ............................. | 33/668 |
| 6,108,926 A | 8/2000 | Fraser et al. | | |
| 6,212,787 B1 * | 4/2001 | Dixon | ............................. | 33/759 |
| 6,223,443 B1 * | 5/2001 | Jacobs | ............................ | 33/760 |
| 6,442,860 B1 * | 9/2002 | Williams et al. | ................ | 33/668 |
| 6,497,050 B1 | 12/2002 | Ricalde | | |
| 6,941,672 B2 | 9/2005 | Scarborough | | |
| 6,996,915 B2 | 2/2006 | Ricalde | | |
| 7,269,913 B2 * | 9/2007 | Holevas | .......................... | 33/668 |
| 7,490,415 B1 * | 2/2009 | Cubbedge | ....................... | 33/770 |

(Continued)

FOREIGN PATENT DOCUMENTS

WO 03085353 A1 10/2003
WO 2013082098 A1 6/2013

*Primary Examiner* — Yaritza Guadalupe-McCall
(74) *Attorney, Agent, or Firm* — Darrow Mustafa PC

(57) ABSTRACT

A tape measure system includes a slide element and a tape measure. The tape measure includes a housing and a tape at least partially stored within the housing. The tape can be selectively extended from and selectively retractable into the housing. The slide element slidably engages the tape of the tape measure. For instance, the slide element can include a body with an internal passage in which an extended portion of the tape can be received. The slide element can be selectively movable along the extended portion of the tape. One or more holders can be attached to the body of the slide element. The one or more holders include a passage configured to receive a marking implement therein. The slide element and/or the tape measure can be selectively moved to mark a surface using a marking implement received in one of the holders.

19 Claims, 10 Drawing Sheets

(56) References Cited

U.S. PATENT DOCUMENTS

| | | | |
|---|---|---|---|
| 7,500,322 B2 * | 3/2009 | Brown | 33/668 |
| 8,020,312 B1 * | 9/2011 | McGahan | 33/770 |
| 8,127,461 B1 * | 3/2012 | Peri | 33/770 |
| 8,196,308 B1 * | 6/2012 | Baldi, Jr. | 33/668 |
| 8,429,830 B2 | 4/2013 | Kang | |
| 8,522,447 B1 * | 9/2013 | Novotny | 33/770 |
| 8,590,171 B2 | 11/2013 | Ricalde | |
| 8,819,954 B1 * | 9/2014 | Fernandez | 33/668 |
| 2001/0042315 A1 * | 11/2001 | Dixon | 33/758 |
| 2003/0182811 A1 * | 10/2003 | Hairapetian | 33/27.032 |
| 2004/0025364 A1 * | 2/2004 | Elder et al. | 33/770 |
| 2007/0214674 A1 | 9/2007 | Erisoty et al. | |
| 2007/0289155 A1 * | 12/2007 | Winemiller | 33/760 |
| 2008/0098610 A1 * | 5/2008 | Lipps | 33/770 |
| 2009/0090017 A1 * | 4/2009 | Smiroldo | 33/770 |
| 2009/0271999 A1 * | 11/2009 | Alker | 33/762 |
| 2009/0307920 A1 | 12/2009 | Schrage | |
| 2010/0000102 A1 * | 1/2010 | Contreras | 33/27.03 |
| 2010/0186249 A1 * | 7/2010 | Grivas et al. | 33/668 |
| 2012/0036727 A1 * | 2/2012 | McCarthy | 33/760 |
| 2012/0055038 A1 * | 3/2012 | Lindsay | 33/761 |
| 2013/0047455 A1 | 2/2013 | Steele et al. | |
| 2013/0133215 A1 | 5/2013 | Bridges et al. | |
| 2013/0185949 A1 | 7/2013 | Burch et al. | |
| 2014/0317943 A1 * | 10/2014 | DeMartinis et al. | 33/668 |
| 2015/0052771 A1 * | 2/2015 | Mamatkhan et al. | 33/701 |

* cited by examiner

TAPE MEASURE DEVICE, SYSTEM AND METHOD

FIELD

Embodiments relate in general to measuring tools and, more particularly, to tape measures.

BACKGROUND

In construction and carpentry, a variety of tools may be used to measure and mark a location where work is to be performed. One tool that is commonly used for such purposes is a tape measure. A tape measure can be used to measure one or more distances or locations on a surface. In combination with a tape measure, a pencil may be used to mark the surface at the measured location. Alternatively or in addition, a compass may be used to draw an arc, or a square may be used to draw a line at the measured location. The use of such tools can be cumbersome.

Further, such activities may require the assistance of additional personnel. For instance, when measuring points on a surface (e.g. a floor, a subfloor, a ceiling, or walls) one person is needed to hold the tape measure at a particular spot on one end, and a second person is needed to hold the tape measure at the opposite end. The first person or the second person may be able to also mark one or more appropriate spots on the surface. However, in some instances, a third person may be needed to mark the one or more spots. Such actions are time consuming, labor intensive and costly.

SUMMARY

In one respect, embodiments are directed to a slide element for a tape measure. The slide element includes a body configured to slidably engage a tape of a tape measure therein. A first holder is attached to the body. The first holder includes a receiving passage configured to receive a marking implement therein.

In another respect, embodiments are directed to a tape measure system. The system includes a tape measure and a slide element. The tape measure includes a tape measure housing and a tape at least partially stored within the tape measure housing. The tape is selectively extendable from and selectively retractable into the tape measure housing. The slide element slidably engages the tape of the tape measure. The slide element includes a body and a first holder attached to the body. The first holder includes a receiving passage configured to receive a marking implement therein. The slide element is selectively movable along an extended length of the tape.

In still another respect, embodiments are directed to a method of using a tape measure system. The system includes a tape measure and a slide element. The tape measure has a tape measure housing and a tape at least partially stored within the tape measure housing. The tape is selectively extendable from and selectively retractable into the tape measure housing. The system further includes a slide element. The slide element can slidably engage the tape of the tape measure. The slide element includes a body and a first holder is attached to the body. A marking implement can be received in the first holder. The slide element is selectively movable along an extended length of the tape. According to the method, a portion of the tape measure system is anchored to a surface. The slide element is selectively moved so that the marking implement marks the surface.

DETAILED DESCRIPTION

Figure 1:
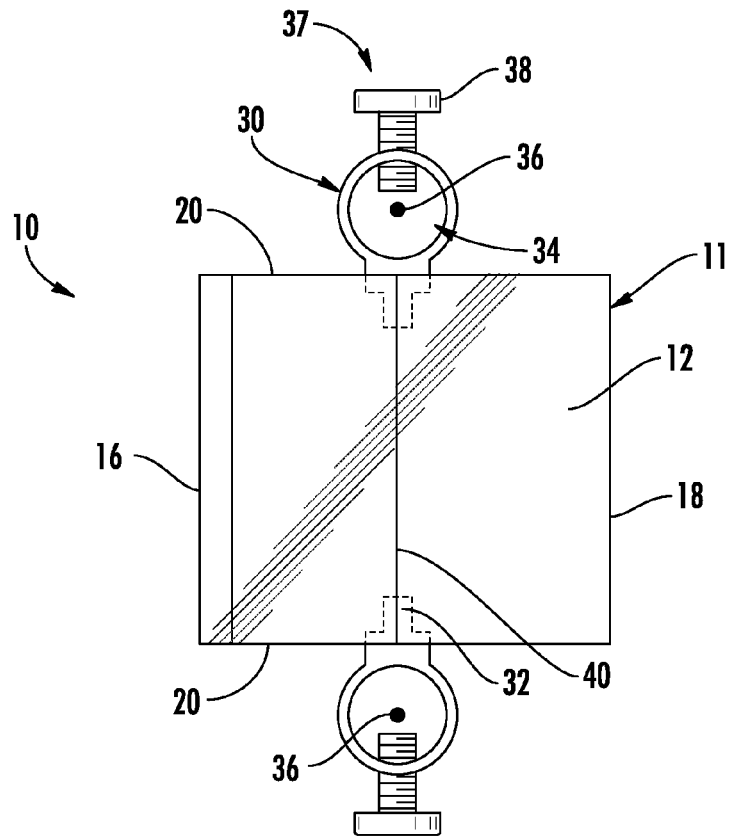
FIG. 1 is an example of a top view of a slide element.
Figure 2:
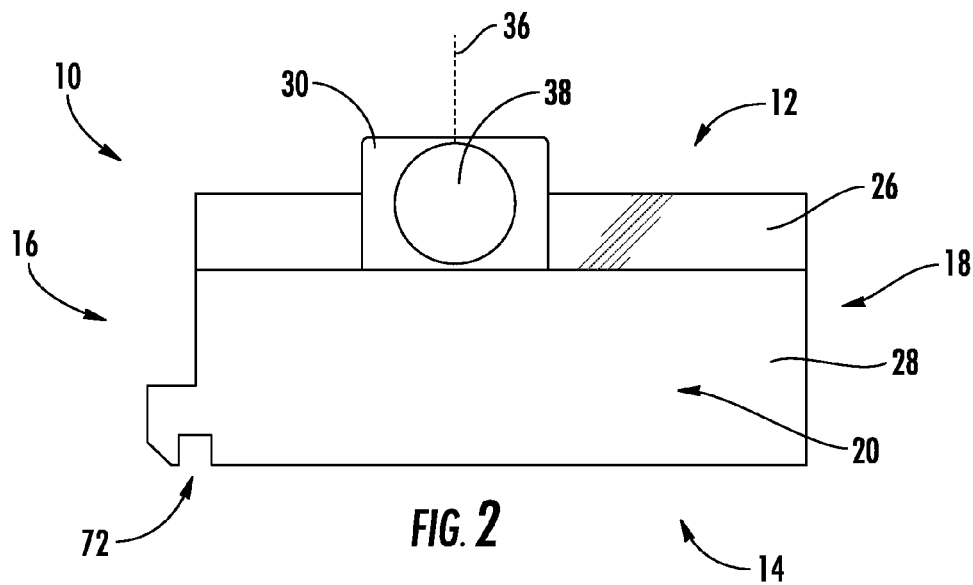
FIG. 2 is a side view of the slide element.
Figure 3:
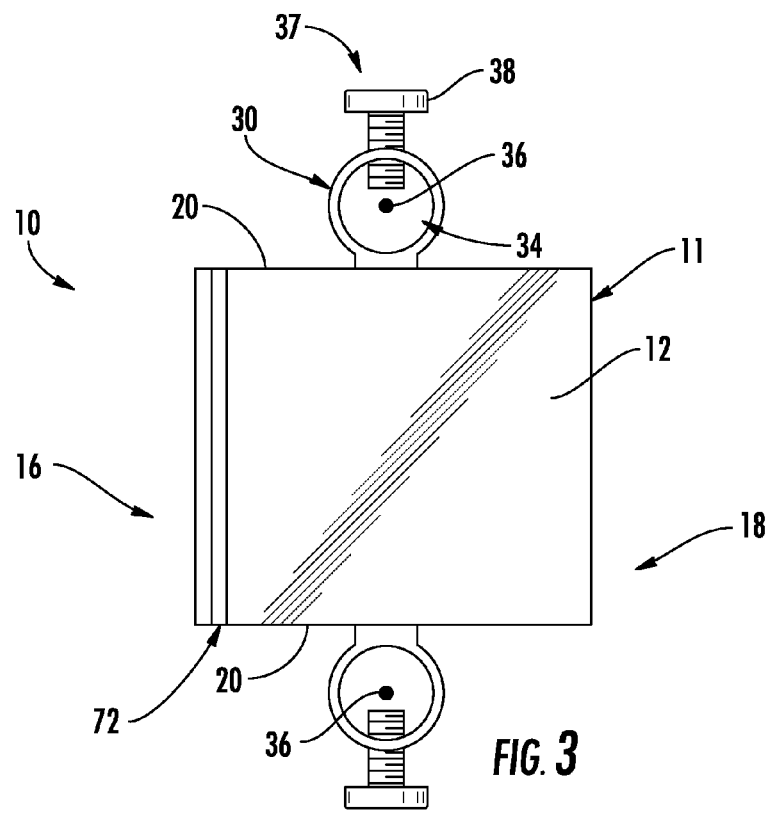
FIG. 3 is a bottom view of the slide element.
Figure 4:
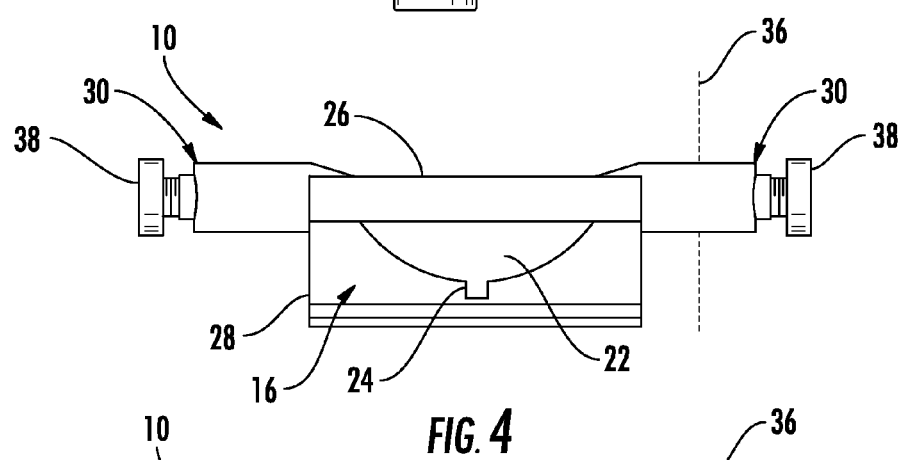
FIG. 4 is a view of a proximal end of the slide element.
Figure 5:
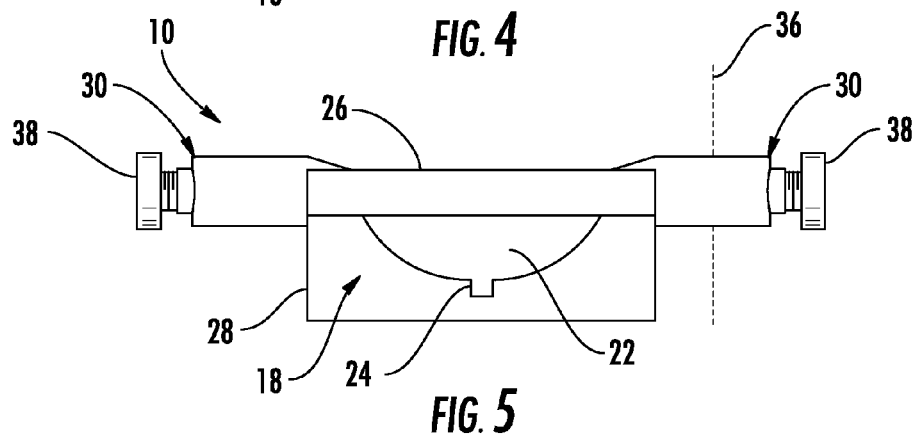
FIG. 5 is a view of a distal end of the slide element.

Arrangements described herein relate to a slide element for use in connection with a tape measure and associated systems and methods. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Arrangements are shown in FIGS. 1-18, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIGS. 1-5, an example of a slide element 10 is shown. The slide element 10 can include a body 11. The body 11 can have any suitable size and/or shape. While the body shown in FIGS. 1-5 is generally rectangular, it will be appreciated that other shapes are possible, including, for example, circular, triangular, polygonal, trapezoidal, just to name a few possibilities. In some instances, the slide element 10 can include an upper side 12 and a lower side 14. The upper side 12 and/or the lower side 14 can be substantially planar. However, the upper side 12 and/or the lower side 14 may be non-planar. The upper side 12 and the lower side 14 can be substantially parallel to each other. In some arrangements, the upper side 12 and the lower side 14 can be non-parallel to each other.

In some instances, the slide element 10 can include a proximal end 16 and a distal end 18. The proximal end 16 and the distal end 18 can be opposite to each other. When the slide element 10 is used in connection with a tape measure, as will be described in more detail below, the proximal end 16 can generally face toward the housing of the tape measure, and the distal end 18 can generally face away from the housing of the tape measure.

The proximal end 16 can have any suitable configuration. For instance, the proximal end 16 can be configured to contact a portion of a tape measure, such as at least a portion of the housing of a tape measure. More particularly, the proximal end 16 can be configured to substantially matingly engage the housing of a tape measure. The distal end 18 can have any suitable configuration. The distal end 18 can have any suitable configuration. For instance, the distal end 18 can be generally planar. Alternatively, the distal end 18 can include one or more non-planar features, including protrusions, recesses or steps, just to name a few possibilities.

In some instances, the slide element 10 can include one or more lateral sides 20. The one or more lateral sides 20 can have any suitable configuration. As an example, at least one of the lateral sides 20 can be substantially planar. At least one of the lateral sides 20 can be non-planar. In some instances, there can be two opposing lateral sides 20, as is shown in FIGS. 1-5. In such case, the lateral sides 20 can be substantially parallel to each other. Alternatively, the lateral sides 20 may be non-parallel to each other. In some instances, the body 11 can be circular or oval in shape. In such case, there may be a single continuous lateral side.

It will be understood that the terms "upper," "lower," "lateral," "proximal" and "distal" and other relative spatial terms are used throughout this description merely for convenience to facilitate the description based on the orientation of illustrated elements, such as the slide element shown in FIGS. 1-5. However, it will be understood that these terms are not intended to be limiting.

The slide element 10 can be adapted to slidably engage a tape of a tape measure. The slidably engagement can be achieved in any suitable manner. In one implementation, the slide element 10 can include an internal passage 22. The passage 22 can extend through the slide element 10. In one embodiment, the passage 22 can extend generally from the proximal end 16 to the distal end 18. The passage 22 can be open on its ends. For instance, one end of the passage 22 can open to the proximal end 16 of the slide element 10, and the other end of the passage 22 can open to the distal end 18 of the slide element 10. In some instances, the passage 22 can be substantially straight.

The passage 22 can have any suitable configuration. The passage 22 can be sized and/or shaped to receive the tape of a tape measure. In one embodiment, the passage 22 can be generally parabolic in conformation. However, the passage 22 can be any other shape, including rectangular, semi-circular, semi-oval or semi-polygon. In some implementations, the shape of the passage 22 can generally correspond to the shape of the tape of a measuring tape received therein. The passage 22 can also include features to accommodate other portions of the tape measure. For instance, the passage 22 can include a keyway 24 to accommodate other elements of the measuring tape (e.g. rivets or other fasteners used to attach an end element to an end region of the tape).

In some implementations, the passage 22 can be configured to minimize friction with a tape of a tape measure. For instance, the passage 22 can be coated with a wear minimizing material, such as a lubricant. However, the passage 22 may also be configured to provide an amount of friction between the slide element 10 and the tape of a tape measure to minimize unintended movement of the slide element 10 along the tape.

The slide element 10 can be formed in any suitable manner. In one implementation, the slide element 10 can be made of a single piece. For instance, the slide element 10 can be formed by casting, injection molding, machining, or other suitable method of manufacture. In other implementations, the slide element 10 can be made of a plurality of pieces. In such case, the plurality of pieces can be formed separately, such as by casting, injection molding, machining. The plurality of pieces can be subsequently joined, such as by one or more fasteners, adhesives, mechanical engagement, welding, brazing or other suitable technique. FIGS. 1-5 show an example of a slide element 10 made of two pieces. In such case, the slide element 10 can include an upper part 26 and a lower part 28. The passage 22 can be collectively defined by the upper and lower parts 26, 28. It will be understood that the slide element 10 shown in FIGS. 1-5 can be made of a single piece.

The slide element 10 can be made of any suitable material. For instance, the slide element 10 can be made of plastic. When made of a plurality of parts, the slide element 10 can be made of more than one material. In one embodiment, at least a portion of the slide element 10 can be transparent or translucent. For instance, at least a portion of the upper side 12 of the slide element 10 can be transparent or translucent to allow a user to see the scale and/or other markings on the tape of the tape measure passing therethrough. When the slide element 10 includes an upper part 26 and a lower part 28, as described above, at least the upper part 26 can be transparent or translucent.

The slide element 10 can include one or more holders 30. A marking implement 44 (FIGS. 12-13) can be received in each of the holders 30. The holders 30 can be configured to selective hold the marking implement 44 therein. The marking implement 44 can be any suitable device that can mark, including, for example, a pencil 46, pen, marker, chalk, crayon or other device that can be used to write a mark on a surface. The holder 30 can be provided on a portion of the slide element 10. For instance, the holder 30 can be provided on at least one of the lateral sides 20 of the slide element 10. In one implementation, there can be two holders 30. One of the holders 30 can be provided on opposite portions of the slide element 10. For instance, one of the holders 30 can be provide on one lateral side 20 of the slide element 10, and the other holder 30 can be provided on the opposite lateral side 20 of the slide element 10.

The holder 30 can be associated with the slide element 10 in any suitable manner. In one implementation, the one or more holders 30 can be formed as a single piece with the slide element 10. In another implementation, the one or more holders 30 can be attached to the slide element 30 using one or more fasteners (e.g. screws, pins 32, etc.), adhesives, mechanical engagement, other suitable manner of attachment and/or combinations thereof.

The one or more holders 30 can include a tape receiving passage 34. The tape receiving passage 34 can have an associated axis 36. The tape receiving passage 34 can have any suitable size and/or shape. The tape receiving passage 34 can be sized and shaped to receive the marking implement 44 therein.

The tape receiving passage 34 can be adapted to selectively hold the marking implement 44 therein. For instance, the holder 30 can include a tightening element 37 for directly or indirectly engaging a marking implement 44 received within the tape receiving passage 34. In one embodiment, the tightening element 37 can be a screw 38 or other fastener. A user can selectively tighten or loosen the screw 38 to hold or release the marking implement 44 in the holder 30.

Figure 11:
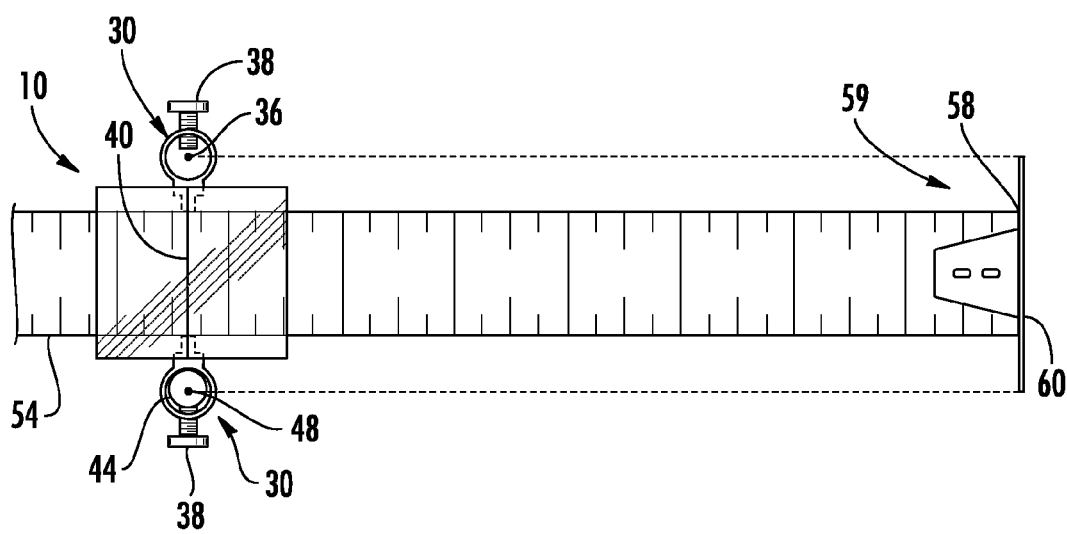
FIG. 11 is a top view of the system, showing the anchor elements on the end element substantially aligned with a portion of the slide element.
Figure 12:
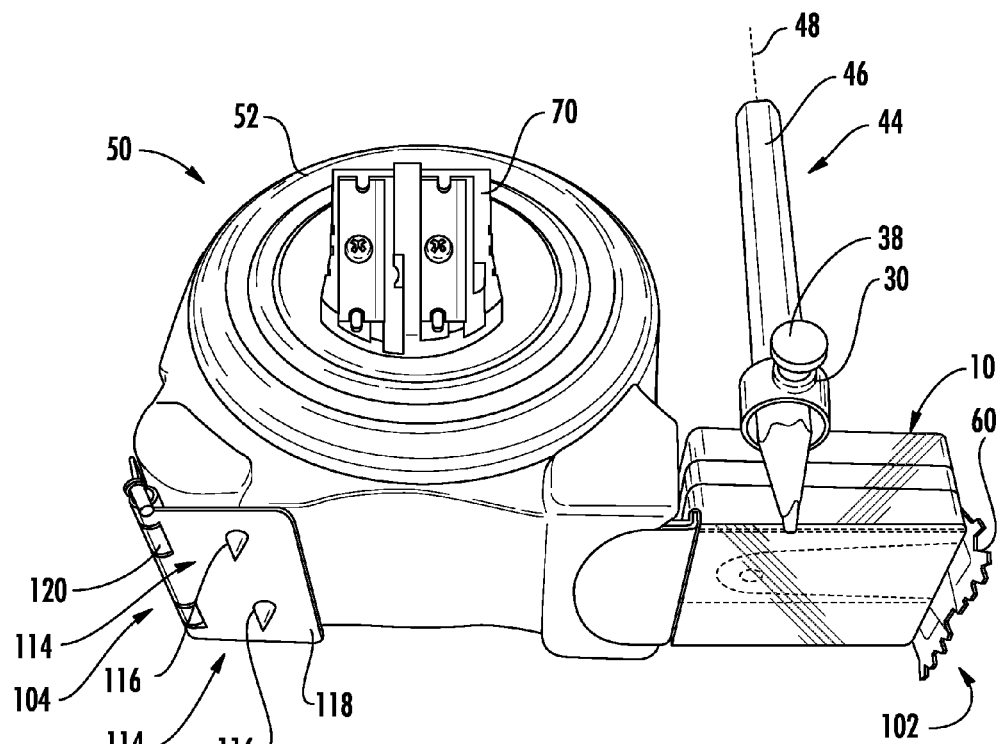
FIG. 12 is an example of a second anchor region of the system, showing an anchor carrying plate in a closed position.
Figure 13:
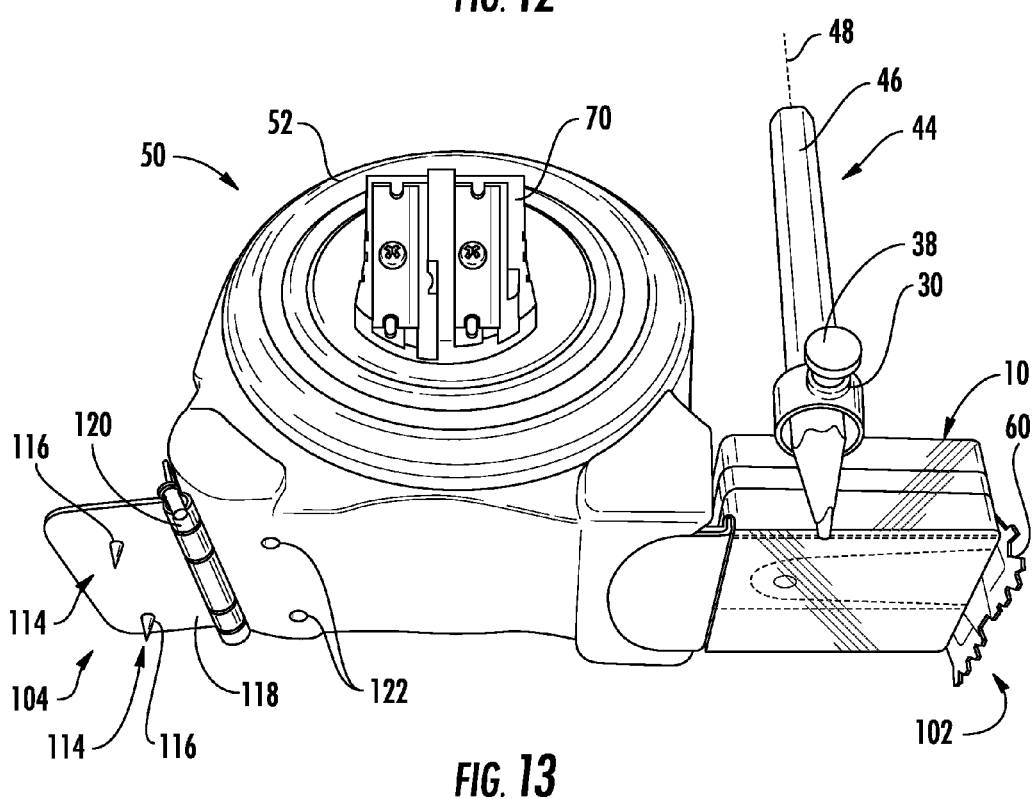
FIG. 13 is an example of the second anchor region of the system, showing the anchor-carrying plate in an open configuration.

The marking implement 44 can have an associated axis 48 (see FIGS. 11-13). When secured in the holder 30, the axis 48 of the marking implement 44 can be substantially coaxial with the axis 36 of the holder 30. Alternatively, the axis 48 of the marking implement 44 can be offset from the axis 36 of the holder 30. For instance, the axis 48 of the marking implement 44 can be offset so that it is location between the axis 36 of the holder 30 and the associated lateral side 20 of the slide element 10.

Further, the slide element 10 can include a guide line 40. The guide line 40 can be a straight line extending across at least a portion of the slide element 10. For instance, the guide line 40 can extend across at least a portion of the upper side 12 of the slide element 10. Further, the guide line 40 can extend in the direction from one of the lateral sides 20 to the opposite lateral side 20 of the slide element 10. The guide line 40 can extend transverse to the direction of the passage 22 in the slide element 10. More particularly, the guide line 40 can extend at substantially 90 degrees relative to the direction of the passage 22 in the slide element 40.

The guide line 40 can be formed in any suitable manner. For instance, the guide line 40 can be formed by painting, etching, carving, machining, just to name a few possibilities. The guide line 40 can be used to align with a desired location on the tape of a measuring tape. The guide line 40 can be substantially aligned with the respective axes 36 of the holders 30. As such, marks made using a marking implement 44 within the holders 30 at a point that is substantially aligned with the guide line 40.

Figure 6:
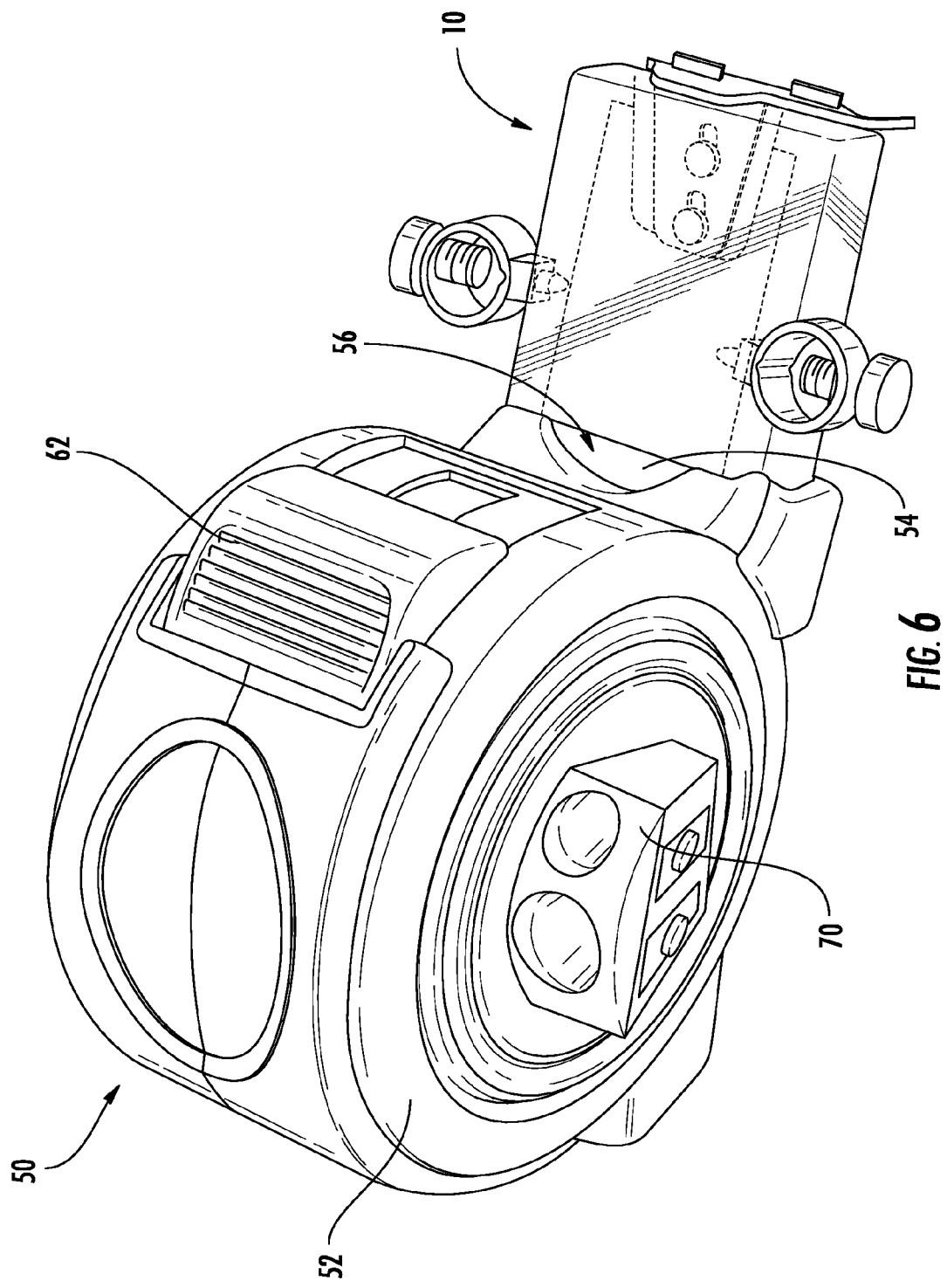
FIG. 6 is a view of a system that includes the slide element provided on a tape measure.

Referring to FIG. 6, arrangements can include a system 100 in which the slide element 10 is used in combination with a tape measure 50. The tape measure 50 can be any type of tape measure. The tape measure 50 can include any known tape measure and any components thereof. Various examples of tape measures and their basic associated components (e.g. housing, tape, etc.) are described in U.S. Pat. Nos. 5,809,662; 6,108,926; 6,941,672; and 8,429,830 and U.S. Patent Application Publication Nos. 2007/0214674; 2009/0307920; 2013/0047455; 2013/0133215; and 2013/0185949, each of which is incorporated herein by reference in their entirety.

Generally, the tape measure 50 can include a housing 52. The housing 52 can have any suitable form. The housing 52 can be made of one or more parts. The housing 52 can include one or more coverings, components, grips, clips, accessories, ergonomic features and/or other features. The housing 52 can be made of any suitable material.

The tape measure 50 can include a tape 54. The tape 54 can be made of any suitable material. The tape 54 can have any suitable form. The tape 54 can have any suitable length. The tape 54 can be generally flat, or it can be curved.

The tape 54 can include various markings thereon. For instance, the tape 54 can include markings of measurement in any suitable scale, including metric units, English units and/or combination thereof. The tape 54 can be selectively extendable and retractable from the tape measure housing 52. One end of the tape 54 can be connected to a structure within the tape measure housing 52. The other end 58 of the tape 54 can remain outside of the tape measure housing 52. To prevent retraction of the end 58 within the tape measure housing 52 and/or for other purposes, an end element 60 can be attached to an end portion 59 of the tape 54. The end element 60 can be made of any suitable material, including, for example, a metal, alloy, plastic. The end element 60 can be attached to the tape 54 in any suitable manner, such as one or more fasteners, adhesives, and/or mechanical engagement. The end element 60 can be formed with the tape 54 itself.

The tape 54 can be provided in any suitable manner within the housing 52. For instance, the tape 54 can be coiled within the tape measure housing 52. The tape 54 may be wound about a spool or drum (not shown). The tape 54 can emerge from the tape measure housing 52 through an exit slot 56. The tape 54 can be configured to be automatically retracting so that, when released, the tape 54 retracts back within the tape measure housing 52. As is well known, the tape measure 50 can include a braking member (not shown) to engage the tape 54 so as to stop or impede its movement of retraction into and/or extension out of the tape measure housing 52. For instance, a user may wish to keep a certain length of the tape 54 extended from the tape measure housing 52. In such case, a user can selectively engage the braking member by operating a brake engaging element 62, as is known.

The slide element 10 can be provided on the tape 54 of the tape measure 50 in any suitable manner. In one implementation, the slide element 10 can be made of two parts. The two parts of the slide element 10 can be brought together about the tape so that a portion of the tape 54 is enclosed within the passage 22 of the slide element 10. The two parts can be joined together in any suitable manner. Alternatively, a portion of the tape 54 without the end element 60 on its end portion 59 can be slid through the passage 22. When the end of the tape 54 exits through the distal end 18 of the slide element 10, the end element 60 can be attached to the end portion 59 of the tape 54.

Figure 18:
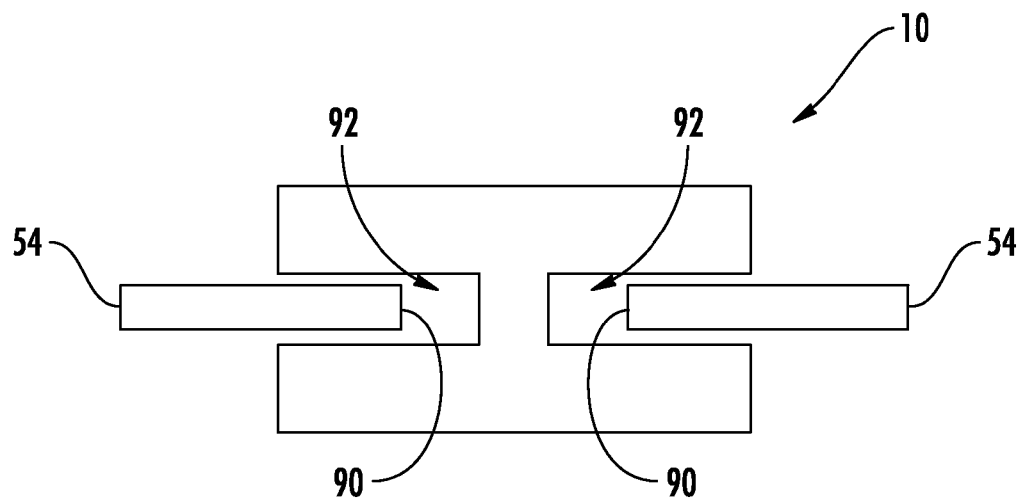
FIG. 18 shows an example of a system with an alternative arrangement for the slide element and the tape of a tape measure.

An alternative configuration of the slide element 10 and the tape 54 and an alternative manner of achieving slidable engagement therebetween is shown in FIG. 18. The tape 54 can include an opening 90 in a central region of the tape 54. The slide element 10 can be configured to be received in the opening 90 and movable therealong. In one implementation, the slide element 10 can be generally I-shaped or generally H-shaped. In such arrangements, the slide element 10 can include side passages 92 in which a portion of the tape 54 can be received.

It will be appreciated that the slide element 10 can be provided as a separate piece from the tape measure 50. In such case, the slide element 10 can be provided as a kit for attachment to a desired tape measure. Alternatively, the slide element 10 can be provided together with the tape measure as a kit. Still alternatively, the slide element 10 and the tape measure 50 can be provided pre-assembled for immediate use.

The slide element 10 can be movable along an extended portion of the tape 54 to any desired location. There can be a sufficient amount of friction between the slide element 10 and the tape 54 such that, when the slide element 10 is not being moved, the slide element 10 can remain substantially in its current location without further sliding or movement along the tape 54.

In some embodiments, the tape measure 50 can include one or more features to facilitate use of the marking implement 44 in connection with the slide element 10. For instance, a pencil sharpener 70 can be integrated into the tape measure housing 54. The pencil sharpener 70 can have any suitable form. The pencil sharpener 70 can be provided in any suitable location on the tape measure housing 52. In some instances, the pencil sharpener 70 may be provided on and/or accessed from the outside of the tape measure housing 52. An example of such an arrangement is shown in FIG. 6. In other instances, the pencil sharpener 70 may be located within the tape measure housing 52. Thus, if the marking implement is a pencil, the user can remove the pencil from the holder 30 and sharpen the pencil using the pencil sharpener 70. When sufficiently sharpened, the marking implement can be returned to the holder 30.

Figure 7:
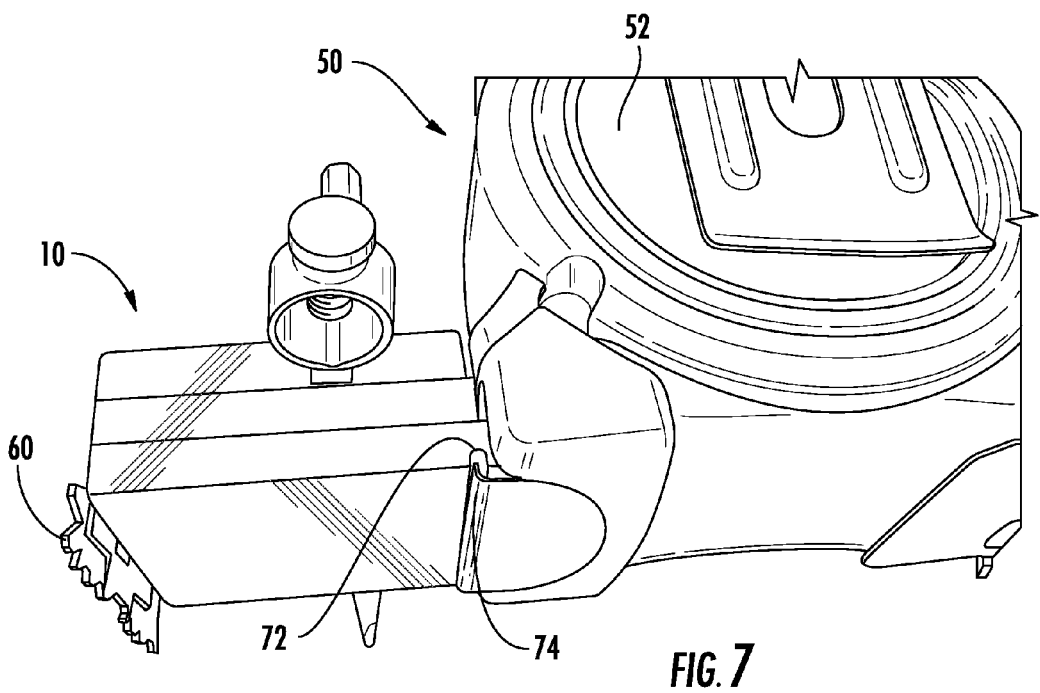
FIG. 7 shows an example of locking engagement between the slide element and the tape measure.
Figure 8:
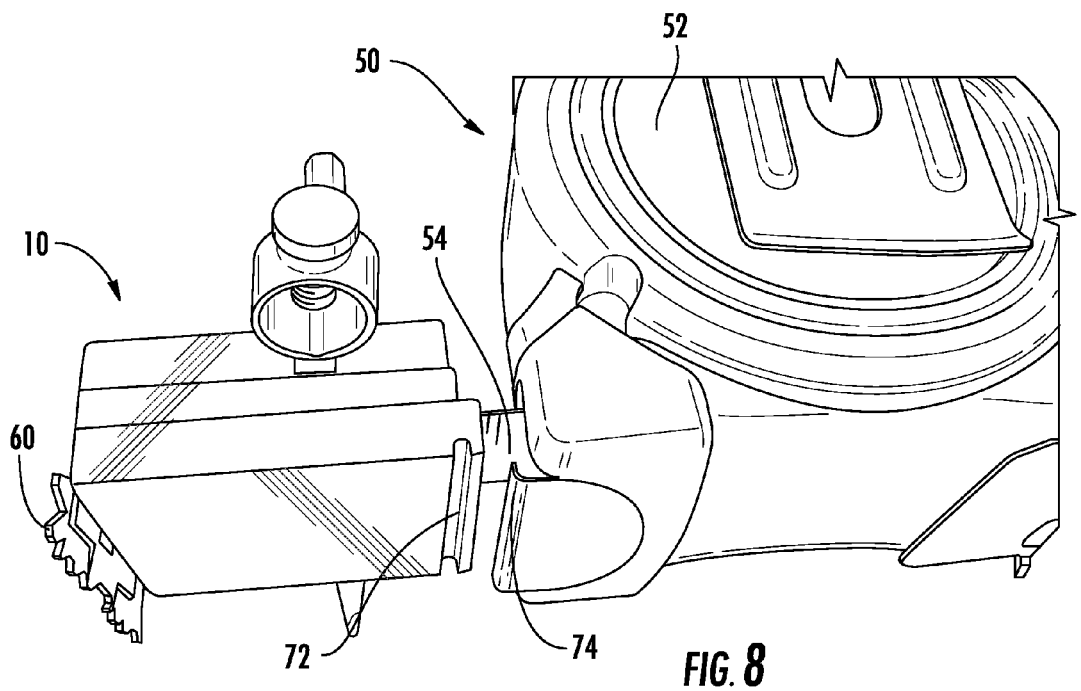
FIG. 8 shows an example in which the slide element is disengaged from the tape measure.

In some instances, it may be desired to prevent unintended or unwanted movement of the slide element 10 when using the tape measure 50. The slide element 10 and/or the tape measure 50 can be configured to allow for locking engagement between the slide element 10 and the tape measure 50. When the slide element 10 is in locking engagement with the tape measure 50, the slide element 10 can be prevented from moving relative to the tape measure housing 52. Such locking engagement can be achieved in any suitable manner. One example of locking engagement is shown in FIGS. 7 and 8. In this example, the slide element 10 can include a channel 72 and the tape measure housing can include a protrusion 74. The channel 72 can be any channel, passage, hole, depression, indentation, groove, concave feature, recessed feature or other female feature. The protrusion 74 can be any protrusion, projection, tongue, peg, convex feature, raised feature or other male feature generally configured to be received in the channel 72.

The channel 72 can be provided in any suitable location on the slide element 10. As an example, the channel 72 can be provided on the lower side 14 of the slide element 10. Alternatively or in addition, the channel 72 can be provided on the upper side 12, proximal end 16 and/or one or both of the lateral sides 20 of the slide element 10. The channel 72 can have any suitable configuration. The channel 72 can open to the lower side 14 of the slide element 10.

The channel 72 can be a single channel or a plurality of channels. The channel 72 can extend across at least a portion of the slide element 10. For instance, the channel 72 can extend in a direction from one lateral side 20 to the other lateral side 20. The channel 72 can have any suitable cross-sectional shape. The channel 72 can be substantially U-shaped, V-shaped, parabolic, rectangular, circular, semi-circular, oval, semi-oval, trapezoidal, polygonal, irregular, just to name a few possibilities. The channel 72 may be elongated, such as a slot extending across the slide element 10. Alternatively, the channel 72 can be a hole provided in a local area of the slide element 10.

The tape measure housing 52 can include a protrusion 74 that is received in the channel 72. The protrusion 74 can be configured for substantially mating engagement in the channel 72. The protrusion 74 can have any suitable configuration. The protrusion 74 can be made of any suitable material, including, for example, metal or plastic. In one embodiment, the protrusion 74 can be formed with the housing. In another embodiment, the protrusion 74 can be defined by a separate piece that is attached to the housing 52.

In the above example, locking engagement between the slide element 10 and the tape measure 50 can be achieved in any suitable manner. For instance, the slide element 10 and/or the tape measure housing 52 can be moved horizontally toward each other. As the slide element 10 and the tape measure housing 52 approach each other, the slide element 10 and/or the tape measure housing 52 can be moved initially vertically away from each other. Once the protrusion 74 and the channel 72 are substantially aligned, the slide element 10 and/or the tape measure housing 52 can be moved initially vertically toward each other so that the protrusion 74 is received in the channel 72, thereby providing locking engagement.

Figure 9:
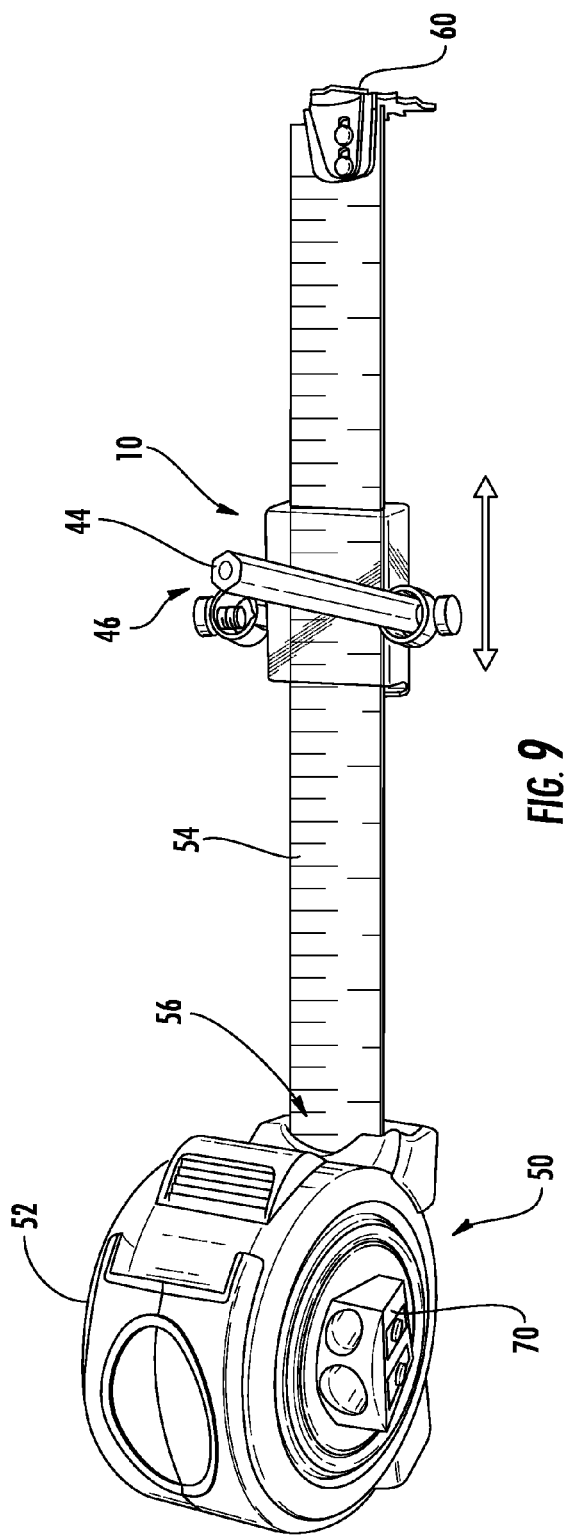
FIG. 9 shows an example of the slide element movable along a portion of tape of the tape measure.

Naturally, the slide element 10 and the tape measure housing 50 can be disengaged from each other by moving one or both of these elements so that the protrusion 74 is not received within the channel 72. When the slide element 10 and the tape measure 50 are not lockingly engaged, the slide element 10 can be selectively moved along the length of the tape 54 that extends from the tape measure housing 52. FIG. 9 show an example of the slide element 10 being moved along the tape 54.

Again, the above arrangement of the channel 72 and the protrusion 74 is one manner of providing locking engagement between the slide element 10 and the tape measure housing 50. It will be appreciated that the opposite arrangement can be provided in which the channel 72 is provided on the tape measure housing 52 and the protrusion 74 is provided on the slide element 10. Still other suitable arrangements are possible.

The system 100 can be configured to allow one or more portions of the system 100 to be held in place at desired location on a surface. To that end, the tape measure system 100 can include one or more anchor regions. In one implementation, the tape measure system 100 can provide at least a first anchor region 102 and a second anchor region 104. The first anchor region 102 can be provided in a portion of the system that is remote from the tape measure housing 52, such as at the end region 59 of the tape 54. The second anchor region 102 can be provided in a portion of the system 100 that is at or near the tape measure housing 52. Each of the anchor regions 102, 104 can include one or more anchor elements. The anchor elements can be any structure that can engage another surface in a manner that minimizes and/or prevents movement of at least that portion of the system 100 on the surface.

Figure 10:
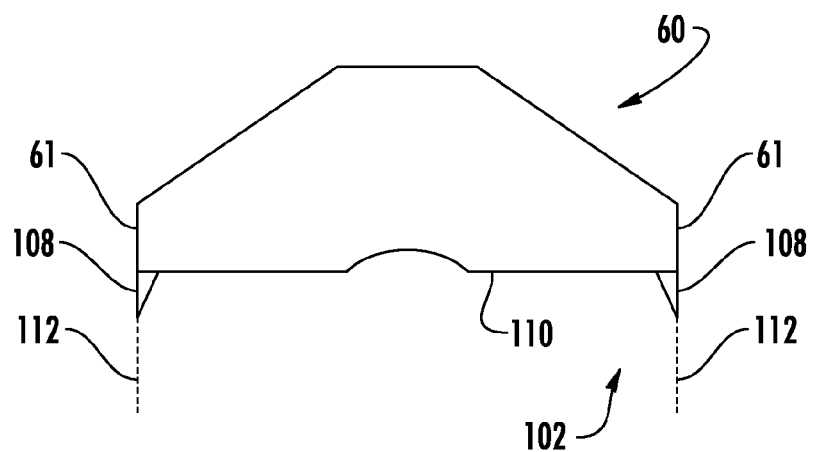
FIG. 10 is an example of a first anchor region of the system, showing a plurality of anchor elements provided on an end element of the tape measure.

In one embodiment, the first anchor region 102 can include one or more anchor elements 106 provided on the end element 60. An example of such an arrangement is shown in FIG. 10. The one or more anchor elements 106 can include one or more pins 108. In one embodiment, there can be a plurality of pins 108. In one implementation, there can be two pins 108. The pins 108 can be provided on opposite lateral sides 61 of the end element 60. The pins 108 can extend beyond a lowermost surface 110 of the end element 60. In one arrangement, the pins 108 can extend about ⅛ inch beyond the lowermost surface 110 of the end element 60. The pins 108 can be sufficiently long to hold the end element 60 to a surface (e.g. a plywood, wood or concrete surface). The pins 108 can be configured to minimize the depth at which the pins dig into the surface. The pins 108 can have an associated axis 112.

The axis 112 of each pin 108 can be substantially aligned with a portion of the slide element 10. FIG. 11 shows some examples of such alignment. In one instance, substantial alignment can include the axis 112 of each pin 108 being substantially aligned with the axis 36 of the holder 30 and/or with the axis 48 of the marking implement 44 that are located on the same side of the tape measure 50 as the pin 108. Alternatively or in addition, substantial alignment can include an arrangements in which an imaginary line that is substantially parallel to the side of the tape 54 of the tape measure 50 passes through both the axis 112 of the pin 108 and the receiving passage 34 of the holder 30 that is located on the same side of the tape measure 50 as the pin 108.

As noted above, the system 100 can include a second anchor region 104. The second anchor region 104 can include one or more anchor elements 114. The anchor elements 114 can be provided on or associated with the tape measure housing 52. An example of such an arrangement is shown in FIGS. 12-13. The one or more anchor elements 114 can include one or more pins 116. In one embodiment, there can be a plurality of pins 116. In one implementation, there can be two pins 116. The pins 116 can have any suitable size and/or shape. In one embodiment, the one or more pins 116 can be about 3/16 inches in length.

The anchor elements 114 can be provided in the second anchor region 104 in any suitable manner. For instance, the anchor elements 114 can be attached directly to or formed in the tape measure housing 52 itself. In such case, a cover (not shown) may be provided on the tape measure housing 52 to prevent unintentional contact with the anchor elements 114.

Alternatively, the anchor elements 114 (e.g. pins 116) can be provided on a separate element that it attached to the tape measure housing 52. For instance, FIGS. 12-13 show an example in which the pins 116 are provided on a plate 118. The plate 118 can be movably attached to the tape measure housing 52. More particularly, the plate 118 can be pivotably attached to the tape measure housing 52. Such manner of attachment can be achieved in any suitable manner, such as by one or more hinges 120 or other pivoting elements.

When the plate 118 is movable, it can include a closed position and an open position. An example of the open position is shown in FIG. 13. In such case, the pins 116 can be exposed for engaging another surface. An example of the closed position is shown in FIG. 12. In such case, the pins 116 may not be exposed. Alternatively, a portion of the pins 116 can protrude from the other side of the plate 118. In such case, the tape measure housing 52 can include respective holes 122 into which the pins 118 can be received when the plate 118 is in the closed position. The holes 122 can have any suitable size and shape to receive a respective one of the pins 116 therein. When in the closed position, the plate 118 can lay substantially flat on the tape measure housing 52.

Now that the various aspects of the slide element 10 and associated systems have been described, various manners of using the slide element 10 and/or associated systems will now be presented. Various possible steps will be described. The method may be applicable to the embodiments described above in relation to FIGS. 1-13 and 18, but it is understood that the method can be carried out with other suitable systems and arrangements. Moreover, the method may include other steps that are not described, and in fact, the method is not limited to including every step described herein. Moreover, the described steps are not limited to the particular chronological order described. Indeed, some of the steps may be performed in a different order than what is described and/or at least some of the steps shown can occur simultaneously.

In some instances, the method can include anchoring a portion of the system 100 to a surface 150. However, in some instances, a portion of the system 100 may not be anchored to the surface 150. The method can also include moving the slide element 10 so that the marking implement 44 marks the surface 150. The movement of the slide element 10 can be done directly, that is, the slide element 10 is directly contact, engaged and/or manipulated such that the slide element 10 moves. For instance, a user may directly contact the slide element 10 with a finger, hand, tool or other item. Alternatively, the movement of the slide element 10 can be done indirectly. For instance, the tape measure housing 52 can be moved, which, in turn, can cause the slide element 10 to move as well. Some specific examples of various aspects of the method will be described below.

Figure 14:
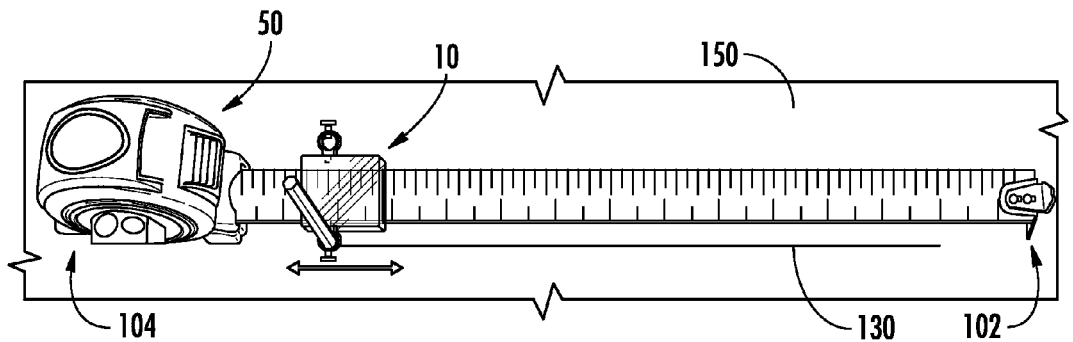
FIG. 14 shows an example of the system being used to draw a line.

In one respect, the system 100 can be used to draw a straight line 130 on a surface 150, as is shown in FIGS. 14. For instance, a portion of tape 52 can be extended from the tape measure 50. Once the desired length of tape 52 is extended, the braking member of the tape measure 50 can be engaged (such as by operating brake engaging element 62) so that the extended portion of the tape 54 does not retract back into the tape measure housing 52. The first anchor region 102 of the system 100 can be anchored to the surface 150, such as by engaging one or more of the anchor elements 106 with the surface. If a line is being drawn on one side of the tape 54, at least one of the anchor elements 106 on that side of the tape 54 can be engaged with the surface 150. The second anchor region 104 of the system 100 can be anchored to the surface, such as by engaging the anchor elements 114 with the surface 150. Again, if a line is being drawn on one side of the tape 54, at least one of the second anchor elements 114 on that side of the tape 54 can be engaged with the surface 150. In some instances, more than one of the first anchor elements and/or the second anchor elements 114 can be engaged with the surface 150. The slide element 10 can be disengaged from the tape measure housing 52.

The one or more marking implements 44 provided with the slide element 10 can be brought into contact with the surface 150. One or both of the marking implements 44 can be moved if needed to achieve such contact. The slide element 10 can be moved along at least a portion of the extended length of the tape 54. During such motion, the one or more marking implements 44 can draw a straight line 130 on the surface 150. When completed, the first and second anchor elements 106, 114 can be disengaged from the surface 150. The extended length of tape 54 can be returned back to the tape measure housing 52. The system 100 can be removed from the surface 150.

Figure 15:
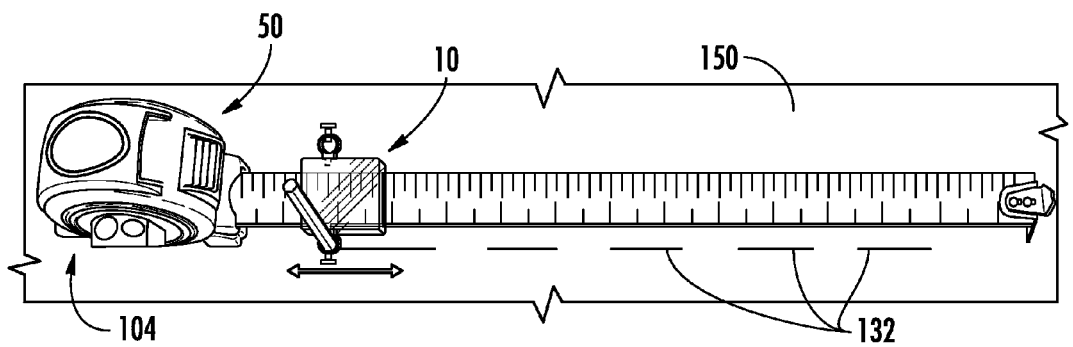
FIG. 15 shows an example of the system being used to draw a plurality of lines.

In another respect, the system 100 can be used to draw a plurality of lines 132 on the surface 150, as is shown in FIG. 15. The above set-up described in connection with FIG. 14 applies equally to the drawing of a plurality of lines 132. The slide element 10 can be moved along at least a portion of the extended length of the tape 54. During such motion, the one or more marking implements 44 can selectively draw a plurality of lines 132 on the surface 150. For instance, when in an area of the surface 150 in which a line 132 should not be drawn, the one or more marking implements 44 can be moved out of contact with the surface 150 in any suitable manner. The lines 132 can be placed in any suitable location. The lines 132 can be substantially equally spaced or one or more of the lines 132 may be unequally spaced. The lines 132 can have substantially the same length, or one or more of the lines 132 can have a different length. When completed, the first and second anchor elements 106, 114 can be disengaged from the surface 150. The extended length of tape 54 can be returned back to the tape measure housing 52. The system 100 can be removed from the surface 150.

Figure 16:
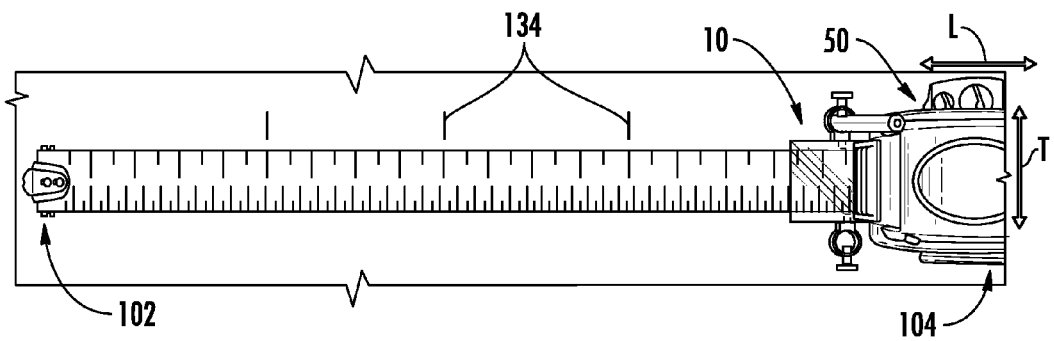
FIG. 16 shows an example of the system being used to draw a plurality of transverse marks.

In another respect, the slide element 10 can be used to make one or more transverse marks 134 at one or more points on the surface 150. An example of such a use is shown in FIG. 16. The transverse marks 134 can extend at an angle relative to the longitudinal direction of the extended length of the tape 54. That is, the transverse marks 34 are not parallel to the longitudinal direction of the extended length of the tape 54. For instance, the transverse marks 134 can extend at substantially 90 degrees relative to the longitudinal direction of the extended length of the tape 54.

The above set-up described in connection with FIG. 14 can apply equally to the drawing of a plurality of transverse marks 134. The slide element 10 may be in locking engagement with the tape measure housing 52. However, in some instances, the slide element 10 may be disengaged from the tape measure housing 52.

The slide element 10 can be moved along at least a portion of the extended length of the tape 54, that is, in a longitudinal direction L. At any desired point, such as when the guide line 40 of the slide element 10 is aligned with the desired measurement, the slide element 10 and/or the tape measure housing 52 can be moved in a generally transverse direction T. During such motion, the one or more marking implements 44 can draw a transverse mark 134 on the surface 150. The transverse mark 134 can be made using the marking implement 44 on one or both sides of the tape 54. In some instances, when in an area of the surface 150 in which a transverse mark 134 should not be drawn, the one or more marking implements 44 can be moved out of contact with the surface 150 in any suitable manner.

The one or more transverse marks 134 can be placed in any suitable location. The transverse marks 134 can be substantially equally spaced or one or more of the transverse marks 134 may be unequally spaced. The transverse marks 134 can have substantially the same length, or at least one of the transverse marks 134 can have a different length. When completed, the first and second anchor elements 106, 114 can be disengaged from the surface 150. The extended length of tape 54 can be returned back to the tape measure housing 52. The system 100 can be removed from the surface 150.

Alternatively or in addition to the above, the tape 54 can be retracted into the tape measure housing 52 while the first anchor region 102 of the system 100 is anchored to the surface 150. As the tape 54 is being received back into the tape measure housing 52, the housing 52 and the slide element 10 can move closer to the first anchor region 102. In this way, transverse marks 134 can be drawn as the tape 54 is being retracted back into the housing 52.

Similarly, one or more transverse marks 134 can be drawn as tape 54 is being extended from the tape measure housing 52. For instance, with the first anchor region 102 being anchored to the surface 150, the tape measure housing 52 can be moved away from the first anchor region 54, thereby causing tape 54 to extend from the housing 52. In some instances, the slide element 10 can be in locking engagement with the tape measure housing 52. At any desired point, the slide element 10 and/or the tape measure housing 52 can be moved in a generally transverse direction T. During such motion, the one or more marking implements 44 can draw a transverse mark 134 on the surface 150.

Figure 17:
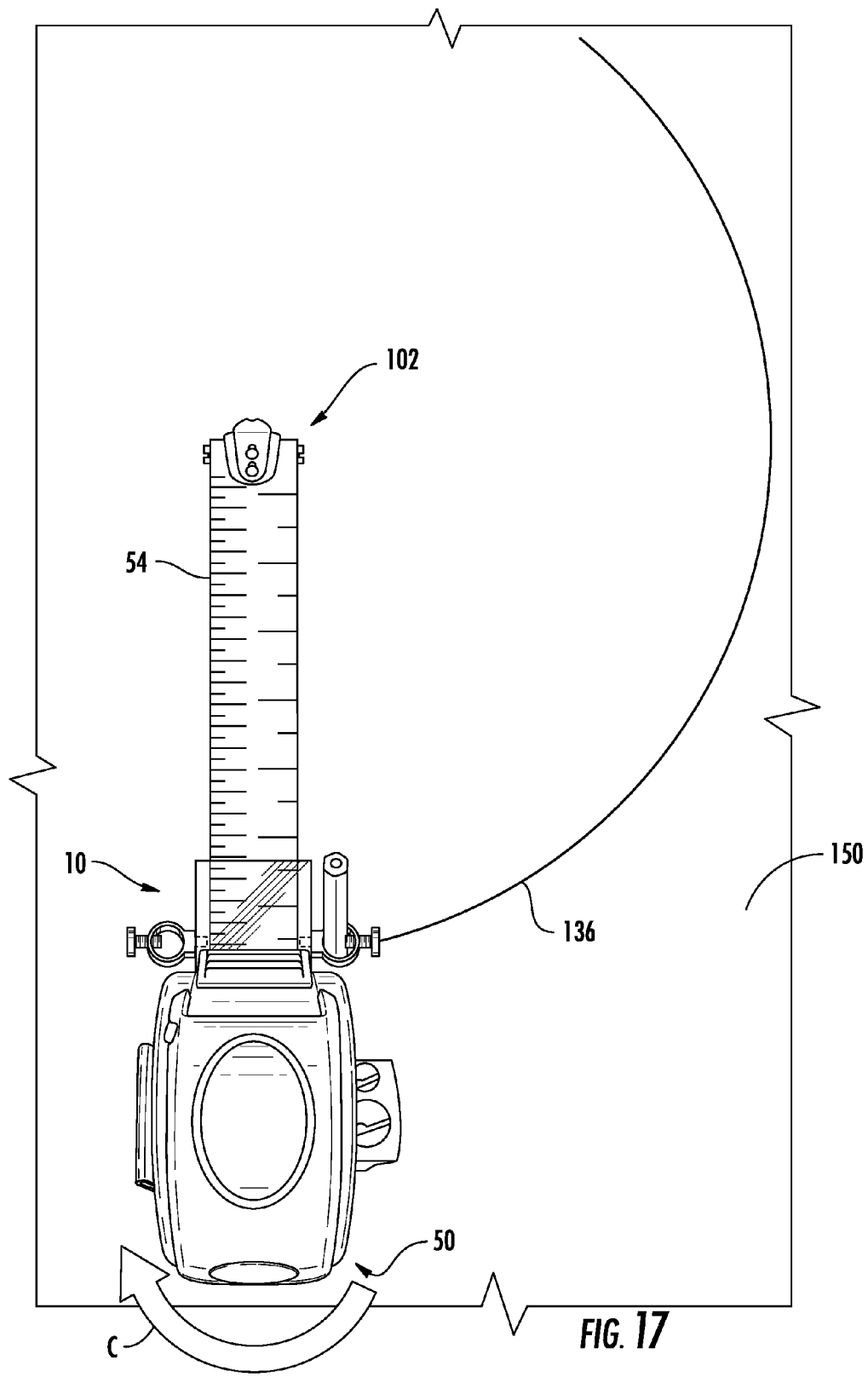
FIG. 17 shows an example of the system being used to draw an arc.

In another respect, the slide element 10 can be used to mark a circle or a portion of a circle (e.g. an arc 136) on the surface 150. An example of such a use is shown in FIG. 17. To that end, a portion of the tape 54 can be extended from the tape measure housing 52. The first anchor region 102 can be anchored to the surface 150, such as by engaging one or more of the anchor elements 106 with the surface 150. The point at which the one or more anchor elements 106 engage the surface 150 can form the center of the circle or portion thereof being drawn.

The tape measure housing 52 can be moved to the desired length. In some instances, the slide element 10 can be in locking engagement with the tape measure housing 52. The guide line 40 of the slide element 10 can be aligned with a desired point on the tape 54. This distance can define the radius of the circle or the portion of a circle being drawn. The tape measure housing 52 and/or the slide element 10 can be moved in a circular or circumferential direction C with the first anchor region 102 of the system 100 anchored to the surface 150. The tape measure housing 52 and/or the slide element 10 can be swept in full circle or any portion thereof.

During such motion, the one or more marking implements 44 can draw a circle or portion of a circle (e.g. arc 136) on the surface 150. The drawing can be made using the marking implement 44 on one or both sides of the tape 54. It will be appreciated that the above method can be used to draw a plurality of arcs at the same radius. Alternatively or in addition, it will be appreciated that the above method can be used to draw one or more circles or circle portions at a plurality of radii. In such case, the circles or circle portions may or may not be substantially concentric.

When completed, the first and second anchor elements 106, 114 can be disengaged from the surface 150. The extended length of tape 54 can be returned back to the tape measure housing 52. The system 100 can be removed from the surface 150

Of course, it will be understood that the system 100 can be used to form any suitable combination of the above drawings on one or more surfaces.

It will be appreciated that the systems and methods described above can provide numerous benefits. For instance, embodiments described herein can achieve multiple functions in a convenient and compact system. Thus, instead of having to carry and use several separate tools, only one tool is needed. Further, in many instances, activities that would normally require two or more people may now only require one person. Still further, systems and methods herein can significantly reduce the amount of time required to complete a project.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible.

What is claimed is:

1. A slide element for a tape measure comprising:
  a body configured to slidably engage a tape of a tape measure, a portion of the body including a channel for receiving a corresponding protrusion of the tape measure housing for selective locking engagement with a portion of a housing of the tape measure, whereby the slide element is prevented from moving relative to the tape measure housing when the slide element is in locking engagement with the tape measure housing,
  the body including an internal passage configured to receive a portion of a tape of the tape measure, at least a portion of the body being translucent or transparent, whereby markings on the tape of the tape measure received in the internal passage are visible through the at least a portion of the body; and
  a first holder attached to a first portion of the body, the first holder including a receiving passage configured to receive a marking implement therein.

2. The slide element of claim 1, wherein the body is made of a plurality of pieces, and wherein the plurality of pieces collectively defines the internal passage.

3. The slide element of claim 1, wherein a portion of the slide element is configured to substantially matingly engage a tape measure housing.

4. The slide element of claim 1, further including a second holder attached to a second portion of the body, wherein the second portion is opposite to the first portion, wherein the second holder includes a receiving passage, whereby a marking implement is received in the receiving passage configured to receive and selectively hold a marking implement therein, and wherein the second holder is substantially aligned with the first holder.

5. The slide element of claim 4, further include a guide line extending across at least a portion of an upper side of the guide element, wherein the first holder has an associated axis, and wherein the guide line is substantially aligned with the axis of the first holder.

6. The slide element of claim 1, wherein the internal passage surrounds the received portion of the tape.

7. A tape measure system comprising:
a tape measure including a tape measure housing and a tape at least partially stored within the tape measure housing, the tape being selectively extendable from and selectively retractable into the tape measure housing, the tape measure including a first anchor region provided on an end region of the tape, the first anchor region including one or more first anchors; and
a slide element slidably engaging the tape of the tape measure, the slide element including a body and a first holder attached to a first portion of the body, the first holder including a receiving passage configured to receive a marking implement therein, the slide element being selectively movable along an extended length of the tape.

8. The tape measure system of claim 7, wherein the body includes an internal passage, and wherein a portion of the tape of the tape measure is received in the internal passage.

9. The tape measure system of claim 7, wherein the one or more first anchors include one or more pins provided on an end element attached to an end portion of the tape.

10. The tape measure system of claim 7, further including a second anchor region provided on the tape measure housing, and wherein the second anchor region including one or more second anchors.

11. The tape measure system of claim 10, wherein the one or more second anchors include one or more pins provided on a plate movably attached to the tape measure housing.

12. The tape measure system of claim 7, wherein the tape measure housing includes a pencil sharpener.

13. The tape measure system of claim 7, wherein a least a portion of the slide element is transparent or translucent such that at least a portion of the tape is visible through the slide element.

14. The tape measure system of claim 7, further including a marking implement received in the first holder.

15. A tape measure system comprising:
a tape measure including a tape measure housing and a tape at least partially stored within the tape measure housing, the tape being selectively extendable from and selectively retractable into the tape measure housing; and
a slide element slidably engaging the tape of the tape measure, the slide element including a body and a first holder attached to a first portion of the body, the first holder including a receiving passage configured to receive a marking implement therein, the slide element being selectively movable along an extended length of the tape, the tape measure housing and the slide element being configured for selective locking engagement, whereby the slide element is prevented from moving along the tape when the slide element is in locking engagement with the tape measure housing.

16. The tape measure system of claim 15, wherein the slide element further includes a second holder attached to a second portion of the body, wherein the second portion is opposite to the first portion, wherein the second holder includes a receiving passage configured to receive a marking implement therein, and wherein the second holder is substantially aligned with the first holder.

17. The tape measure system of claim 16, wherein the slide element further includes a guide line extending across at least a portion of an upper side of the guide element, wherein the first holder has an associated axis, wherein the second holder has an associated axis, wherein the axis of the second holder is substantially parallel to the axis of the first holder, and wherein the guide line is transverse to and substantially aligned with the axis of the first holder and the axis of the second holder.

18. A tape measure system comprising:
a tape measure including a tape measure housing and a tape at least partially stored within the tape measure housing, the tape being selectively extendable from and selectively retractable into the tape measure housing; and
a slide element slidably engaging the tape of the tape measure, the slide element including a body and a first holder attached to a first portion of the body, the first holder including a receiving passage configured to receive a marking implement therein, the slide element being selectively movable along an extended length of the tape, a proximal end of the slide element being configured to substantially matingly engage a portion of the tape measure housing.

19. A method of using a tape measure system, the system including a tape measure having a tape measure housing and a tape at least partially stored within the tape measure housing, the tape being selectively extendable from and selectively retractable into the tape measure housing, the system further including a slide element slidably engaging the tape of the tape measure, the slide element including a body and a first holder attached to a portion of the body, the first holder including a receiving passage configured to receive a marking implement therein, the slide element being selectively movable along an extended length of the tape, a marking implement being retainably received in the receiving passage, the method including:
anchoring a portion of the tape measure system to a surface; and
moving the slide element along at least a portion of the tape such that the marking implement marks at least one substantially straight line on the surface, the substantially straight line extending substantially parallel to the extended length of the tape.

* * * * *